United States Patent [19]

Stocker et al.

[11] Patent Number: 5,029,378

[45] Date of Patent: Jul. 9, 1991

[54] METHOD FOR MAKING AN ADJUSTABLE SIGN HOLDER

[76] Inventors: Harold L. Stocker, 3105 Emmaus Ave., Zion, Ill. 60099; William Farr, 600 E. Jeffery Ave., Wheeling, Ill. 60090

[21] Appl. No.: 553,776

[22] Filed: Jul. 13, 1990

Related U.S. Application Data

[62] Division of Ser. No. 325,519, Mar. 17, 1990, Pat. No. 4,960,258.

[51] Int. Cl.[5] .............................................. B23P 25/00

[52] U.S. Cl. ........................................ 29/462; 29/448

[58] Field of Search .................. 29/448, 462; 248/201, 248/467, 473, 466, 206.5, 309.4, 683; 40/600, 621, 124

[56] References Cited

U.S. PATENT DOCUMENTS

| | | |
|---|---|---|
| 1,015,518 | 1/1912 | Staren . |
| 1,793,696 | 2/1931 | Ipsen . |
| 2,010,404 | 8/1935 | Lush . |
| 2,693,192 | 11/1954 | James . |
| 3,507,245 | 4/1970 | Grabow . |
| 3,783,543 | 1/1974 | Hemgren . |
| 3,797,131 | 3/1974 | Dexter . |
| 3,955,298 | 5/1976 | Kapstad . |
| 4,349,974 | 9/1982 | Rapayelian . |
| 4,630,386 | 12/1986 | Wilson . |
| 4,677,780 | 7/1987 | Shuman . |

OTHER PUBLICATIONS

Author: Harold L. Stacker of: Sears "Sale" Signing Program/Research & Refinement Study.

*Primary Examiner*—Timothy V. Eley
*Assistant Examiner*—C. Richard Martin
*Attorney, Agent, or Firm*—Neuman, Williams, Anderson & Olson

[57] ABSTRACT

Methods and apparatus for attaching a sign element to a base with a frameless magnetically attractive support system.

22 Claims, 2 Drawing Sheets

METHOD FOR MAKING AN ADJUSTABLE SIGN HOLDER

This is a divisional application of Ser. No. 07/325,519, filed March 17, 1990, now U.S. Pat. No. 4,960,258.

FIELD OF THE INVENTION

The present invention relates to support systems for display signs, and more particularly to methods and apparatus for providing a universally adjustable frameless sign installation utilizing magnetically adhesive support.

BACKGROUND OF THE INVENTION

Systems used for mounting and supporting signs on associated base fixtures have generally required that the sign itself be framed with a frame structure, and that the frame structure housing the frame then be secured to the base fixture. When the base fixtures include magnetic field conductive materials, it is very desirable to provide a magnetically attractive mounting system for attaching the sign frame structure to the base fixture. Numerous sign frame structures with magnetically attractive mounting systems have been adopted for this purpose.

However, all of the sign mounting systems in use must be designed or adapted for a sign of particular size, thickness, or both size and thickness, and consequently a large number of different sizes and shapes of display signs requires an equally large number of differently adjusted and configured sign mounting systems.

A large inventory of such sign mounting systems is both costly and cumbersome. Those sign systems which have a range of adjustability require that at least the sign frame structure be modified to accommodate a different size of sign. Furthermore, such adjustable sign frame structures are more costly and complex than non-adjustable sign frame structures.

OBJECTS OF THE INVENTION

Therefore, a primary object of the invention is to secure signs to associated base fixtures with a frameless mounting configuration.

Another object of the invention is to secure signs to associated base fixtures by magnetic attraction.

Yet another object of the invention is to secure signs having a large variation in thickness and surface area to associated base fixtures with a common mounting system.

Still another object of the invention is to reduce the number of components for a universally adjustable sign system.

A further object of the invention is to reduce the cost of a universally adjustable sign system.

A still further object of the invention is to provide for rapid and simple assembly of a universally adjustable sign system.

SUMMARY OF THE INVENTION

The above described objects, as well as other objects and advantages of the present invention which are indicated in the detailed description of the preferred embodiment and recited in the appended claims, are secured with a universally adjustable sign mounting system which includes supporting a sign element along its side edges in side supports having channels for universally coupling to the side edges of sign elements with a wide range of lengths, widths and edge thicknesses, and magnetizing the bases of the side supports to provide magnetic attraction to associated base fixtures. The side supports have sign edge holders which are easily trimmed to match the height of the sign element, if desired. Trimmed sign edge holders are easily replaced in the side supports when a sign element of different height is substituted. Optional control bottom supports secure the sign element to the base fixture in a similar manner for bottom support of unusually long sign elements.

DETAILED DESCRIPTION OF THE PREFERRED EMBODIMENTS

Figure 1:
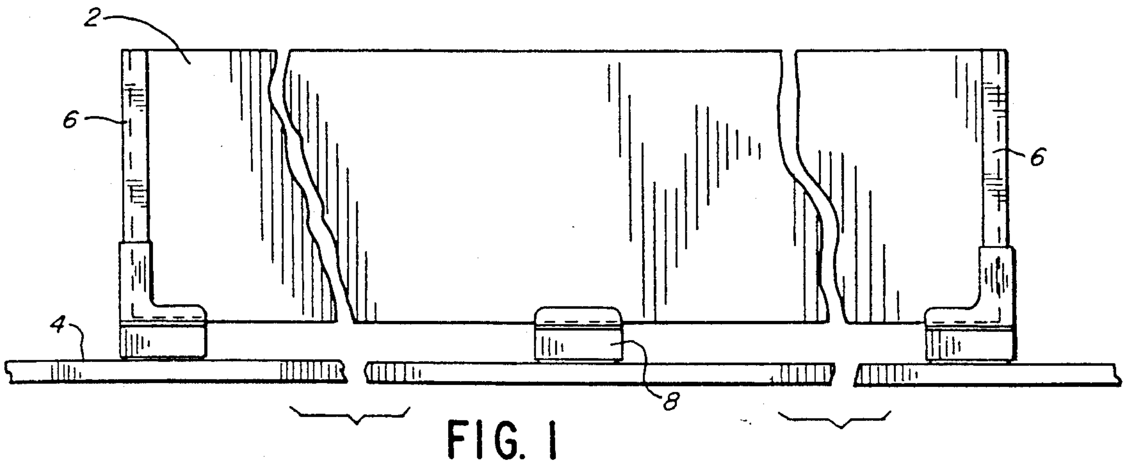
FIG. 1 is a general configuration for mounting a sign element to an associated base fixture according to a preferred embodiment of the invention.

Referring to the drawings, wherein like reference characters designate like or corresponding parts through the views, FIG. 1 shows a general configuration for mounting a sign element 2 on a base fixture 4 according to a preferred embodiment of the invention. The sign element 2 is typically paper, cardboard, posterboard, chipboard, foam core board, plastic, or laminates of these materials, although other materials or laminates thereof can be used. The sign element 2 is secured to the base fixture 4 with two side support members 6, each side support member 6 engaged with the sign element 2 along opposite left and right sides of the sign element 2. Each of the side supports 6 also supports the sign element 2 along its bottom edge as well.

At least one bottom support member 8 may be optionally included to provide additional support and stability for the sign element 2. Each of the bottom support members 8 are engaged with the sign element 2 along its bottom edge. A single bottom support member 8 is shown in FIG. 1, located centrally along the bottom edge of the sign element 2. The bottom support members 8 are desirable for providing additional support and stability when the sign element 2 has an unusually long length. Both the side support members 6 and the bottom support members 8 are secured to the base fixture 4 by magnetic attraction, as described below. The sign element 2 is retained in the side support members 6 and the bottom support members 8 by physical engagement with each other, as described below.

Figure 2:
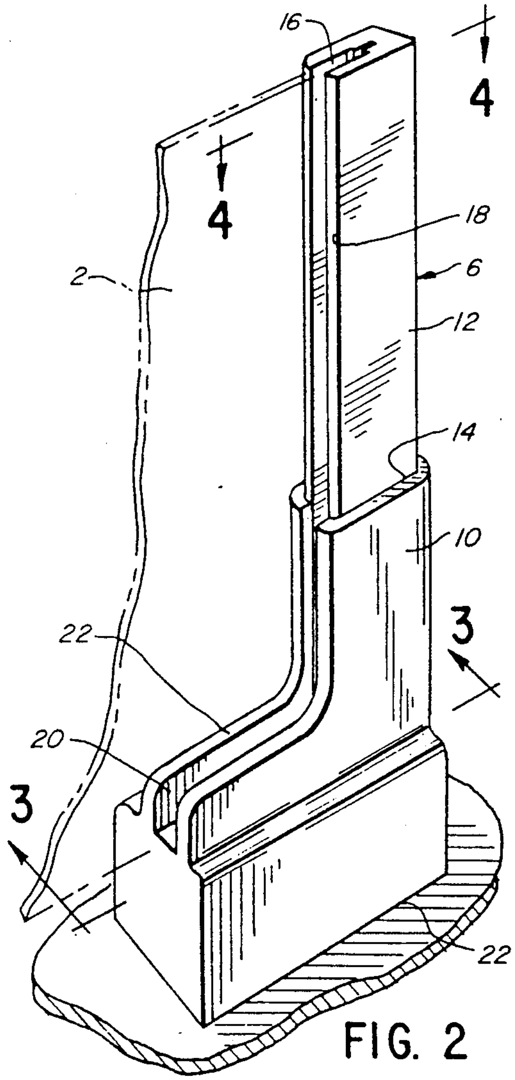
FIG. 2 is a typical sign side support member used in the preferred embodiment shown in FIG. 1.

The general features of a typical arrangement for each of the side support members 6 is shown in FIG. 2. The side support member 6 is shown as a two piece assembly including a shoe base 10 and a sign edge holder 12. The shoe base 10 includes an insertion channel 14 for conformally retaining one end of the sign edge holder 12 with the shoe base 10.

The sign edge holder 12 includes an engagement channel 16 extending along an inwardly facing engagement surface 18 of the sign edge holder 12. The engagement channel 16 includes channel walls which have a channel intrawall separation which decreases with increasing channel depth, as explained below. The shoe base 10 may include a bottom engagement channel section 20 along an upwardly facing engagement surface 22 of the shoe base 10. The bottom engagement channel section 20 may intersect the insertion channel 14 of the shoe base 10 and the side member engagement channel 16 in a substantially perpendicular fashion as shown, or at some acute or obtuse angle, if necessary to conform the shape of the side support member 6 to a non-rectilinear shape for the sign element 2.

The bottom engagement channel section 20 may have channel walls with a substantially constant channel intrawall separation, as shown, or alternatively may have a channel intrawall separation which substantially decreases with increasing depth, as shown for the side member engagement channel 16. The specific channel profile selected for the bottom engagement channel section 20 and the side member engagement channel 16 is a matter of design choice, within the guidelines described below. The bottom engagement channel section 20 may be deleted if a slimmer profile is desired for the shoe base 10 and if each of the side support members 6 is otherwise able to provide sufficient stability and support for the sign element 2 on the base fixture 4.

The shoe base 10 includes a substantially planar bottom support surface 24 to provide a stable platform for the shoe base 10 when mounted on the base fixture 4. The shoe base 10 includes a permanent magnetic field which penetrates the bottom support surface 24 to provide magnetic adhesion between the shoe base 10 and the base fixture 4.

Figure 3:
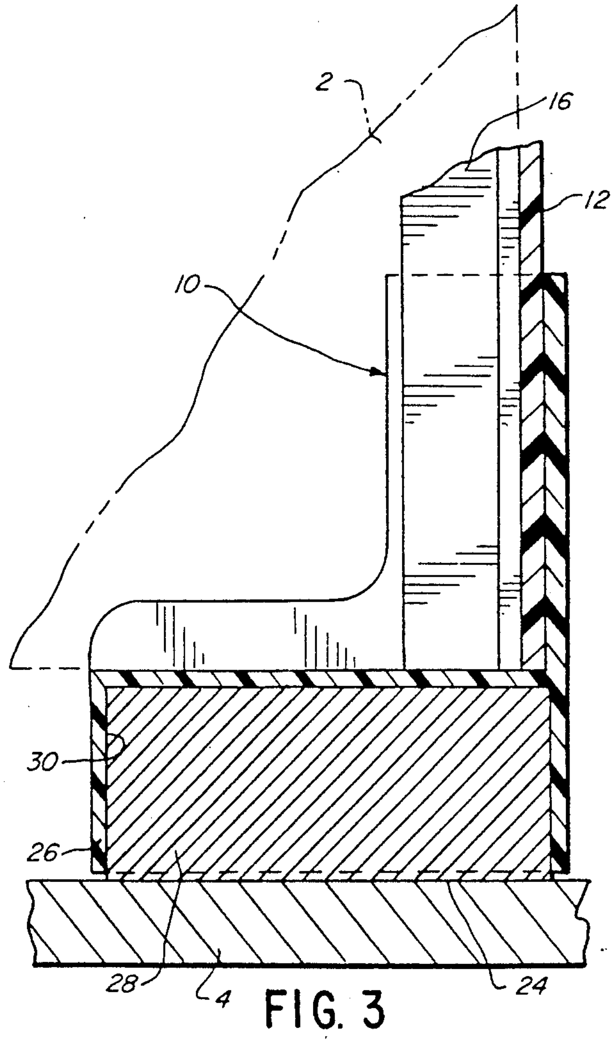
FIG. 3 is a cross-sectional view of the shoe base for the side support member shown in FIG. 2.

A detailed cross-sectional view of the shoe base 10 along the line 3—3 in FIG. 2 is shown in FIG. 3. The shoe base 10 includes a shoe base housing 26 and a magnetic element 28. The magnetic element is mounted to the shoe base housing 26 proximate its lower extremity to provide a magnetic field which passes through the bottom support surface 24. In FIG. 3, the magnetic element 28 is shown embedded in an internal recess 30 formed in the shoe base housing 26, and the bottom surface of the magnetic element 28 serves as the shoe base bottom support surface 24. The magnetic element 28 is easily retained in the recess 30 with an appropriate adhesive. An industrial adhesive such as available under the trade name "Pliabond" is ideal for this purpose.

Alternately, the magnetic element 28 may be clamped onto, rather than fitted within, the shoe base housing 26 so that the design of the shoe base housing 26 may be simplified. This alternative arrangement is satisfactory if the attachment of the magnetic element 28 to the shoe base housing 26 is sufficiently secure. Another alternative arrangement for the shoe base 10 has the magnetic element 28 fully encapsulated in the shoe base housing 26. Such an arrangement advantageously prevents separation of the magnetic element 28 from the shoe base housing 26. This style of mounting can make the bottom support surface 24 mar free if the shoe base housing 26 is chosen to be a plastic material. However, if the magnetic element 28 is fully encapsulated within the shoe base housing 26, the magnetic field strength due to the magnetic element 28 along the bottom support surface 24 may be diminished, thereby reducing the magnetic adhesion between the shoe base 10 and the base fixture 4. If so, the relative magnetic field strength of the magnetic element 28 must consequently be increased to overcome the loss, which in turn may increase the expense, or both the size and the expense, of the shoe base 10.

With still another alternative arrangement, the magnetic element 28 may in fact be at least a region of the shoe base housing 26 made at least partially from some magnetizable material and then magnetized as required. For instance, the shoe base housing 26 may be fabricated with soft iron or any other magnetizable material so long as there is a magnetic field of sufficient intensity for magnetically adhering the shoe base 10 to the base fixture 4.

The magnetic element 28 may be of any material or construction suitable for securing the desired intensity of magnetic field. For instance, a soft iron or ceramic magnet structure, with or without separate associated ferromagnetic pole pieces, may be successfully utilized for this application. A configuration for the magnetic element 28 comprised of a stack of ceramic magnets interleaved with associated plates of a ferromagnetic material, such as low carbon steel, is very suitable.

The shoe housing 26 may be fabricated with any desired material or combination of materials which combine desired strength requirements with fabricability. Since the shoe housing 26 is easily molded, a thermoplastic material such as polyethylene, polystyrene or polyurethane is ideal, when these materials offer sufficient strength. Alternately, nonferrous metallic materials, such as brass, copper or aluminum are ideal when the shoe base housing 26 is used with the separate metallic element 28. As explained above, when a separate magnetic element 28 is not used, the shoe base housing 22 may be fabricated from a magnetizable material itself, such as soft iron or any other magnetizable material.

Figure 4:
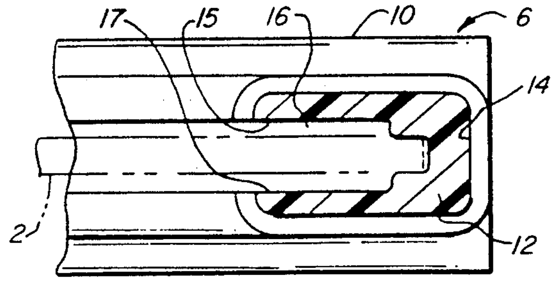
FIG. 4 is a cross-sectional view of the side support member shown in FIG. 2, engaged with a thin side edge of the sign element shown in FIG. 1.

FIG. 4 shows a cross-sectional view of the side support member 6 along the line 4—4 in FIG. 2 with one configuration for the sign edge holder 12 inserted in the shoe base 10. The sign edge holder 12 is shown conformally retained within the insertion channel 14 of the shoe base 10. The engagement channel 16 has a stepped channel wall configuration with two discrete steps each to allow a channel intrawall separation which allows the engagement channel 16 to accept and retain a wide variation in edge thickness for the edges of the sign element 2. The two steps provide a channel intrawall separation which decreases with increasing depth of the engagement channel 16. A thin side edge of the sign element 2 is shown engaged with the inner steps of the engagement channel walls 15 and 17.

Figure 5:
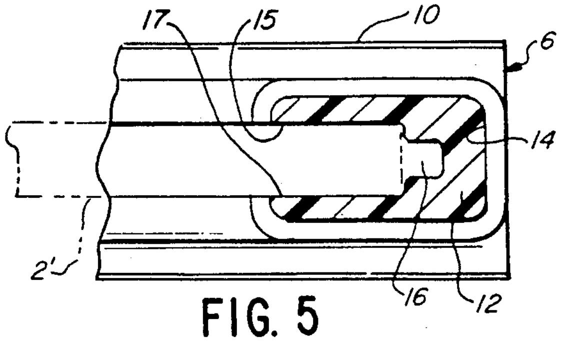
FIG. 5 is the cross-sectional view of the sign edge holder shown in FIG. 4, engaged with a thick side edge of the sign element shown in FIG. 1.

FIG. 5 shows the cross-sectional view of the side support member 6 in FIG. 4, but with a thick side edge of the sign element 2 engaged with the outer steps of the engagement channel walls 15 and 17. Thus, the two-step tapered channel wall configuration allows a close fit between the sides of the sign element 2 and the side support elements 6 for both thick and thin edges of the sign element 2.

Figure 6:
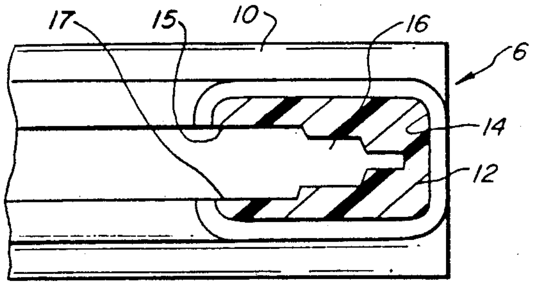
FIG. 6 is an alternate arrangement of for the side support member shown in FIG. 2.

FIG. 6 shows an alternate arrangement for the sign edge holder 12 of the side support member 6 which illustrates the engagement channel 16 with a stepped channel wall configuration with three discrete steps for the channel walls 15 and 17, and with the intrawall separation in the engagement channel 16 once again decreasing with increasing depth of the engagement channel 16. The extra step provided on each of the channel walls 15 and 17 in FIG. 6 allows a tighter and closer fitting coupling with the corresponding edge of the sign element 2.

Figure 7:
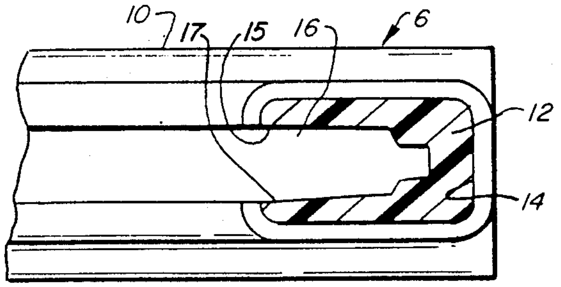
FIG. 7 is another alternate arrangement of the sign edge holder for the side support member shown in FIG. 2.

FIG. 7 shows another alternate arrangement for the sign edge holder 12 of the side support member 6 which illustrates the engagement channel 16 with a two-stepped continuously tapered wall configuration for the channel walls 15 and 17, with the intrawall separation in the engagement channel 16 having a continuously decreasing separation with increasing depth of the engagement channel 16 along each step. This channel wall configuration for the engagement channel 16 also allows a large variation in edge thickness for the corresponding edge of the sign element 2 which is retained by the engagement channel 16. The continuously decreasing intrawall separation allows the corresponding edge of the sign element 2 to jam fit into the engagement channel 16.

Of course, other configurations are possible for the engagement wall 16 which will operate satisfactorily. For instance, the number of steps along the channel walls 15 and 17, shown as two in FIGS. 4 and 5, and three in FIG. 6, can be increased to a much larger number, if desired. In fact, an unstepped, but continuously tapered, wall configuration approximates a very large number of such steps. Therefore, an engagement channel 16 with a continuously tapered wall configuration, such as represented by the outer one of the tapered steps along the channel walls 15 and 17 shown in FIG. 7, is suitable for engaging a range of edge thicknesses for the sign element 2. Furthermore, the slope of the taper used for the channel walls of the engagement channel 16 shown in FIG. 7 need not be straight as shown in FIG. 7, but may have a curvilinear configuration, such as a radial or exponential curvature.

The engagement channel 20 may have linear channel walls as shown in FIG. 2, since the engagement channel 20 is included primarily to provide sufficient alignment of the side support member 6 with a corresponding side edge of the sign element 2 by forcing the bottom edge of the sign element 2 into the engagement channel 20. Therefore, only a loose fit between the bottom edge of the sign element 2 and the engagement channel 20 is necessary in this case, and a stepped, step-tapered or continuously tapered channel wall configuration for the engagement channel 20, such as shown for the engagement channel 16 in FIGS. 4 through 7, is optional if extra holding power is desirable between the sign element 2 and each of the side support members 6.

The sign edge holder 12 may be fabricated of any convenient material for such purpose, provided it has the necessary strength to maintain suitable support for the sign element 2 when engaged with it. For most purposes, an extruded thermoplastic material is sufficient, such as extruded polyethylene, polystyrene, polyurethane, or polycarbonate. The advantage of these materials is low cost and weight combined with the ease of trimming the height of the sign edge holder 12 to any desired length, whether it be to trim the length of the sign edge holder 12 to match the length of the sign element 2, or otherwise. Of course, the sign edge holder 12 may actually be sized shorter or longer than the edge of the sign element 2 to which it attaches.

Figure 8:
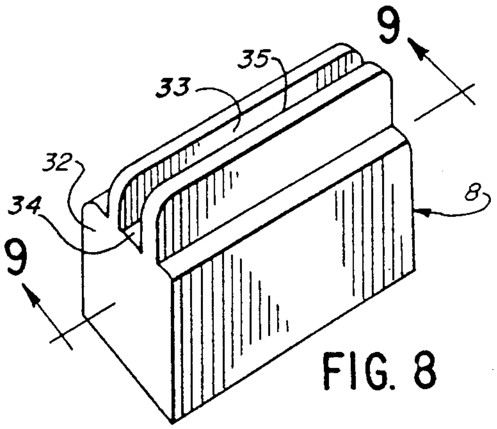
FIG. 8 is a typical bottom support member used in the preferred embodiment shown in FIG. 1.

FIG. 8 shows the general configuration of the bottom support member 8. It includes its own mounting base 32 with an alignment channel 34. The alignment channel 34 engages the bottom edge of the sign element 2. As shown in FIG. 8, the bottom support member 8 is shown with a configuration for the alignment channel 34 intended to restrict the lateral movement of, rather than to forcibly retain, the bottom edge of the sign element 2. Such an arrangement is desirable when the bottom support member 8 is used in combination with a pair of the side support members 6, as shown in FIG. 1.

Alternately, the alignment channel 34 may include channel walls 33 and 35 that have a stepped, tapered or step-tapered configuration, such as shown for the engagement channel 16 in FIGS. 4 through 7, so that the alignment channel 34 engages the bottom edge of the sign element 2 in the same way that the engagement channel 16 of the side support members 6 do as described above. In this way, one or more bottom support members 8 may be used without any of the side support members 6 to support the sign element 2 if bottom support for the sign element 2 is sufficient.

Figure 9:
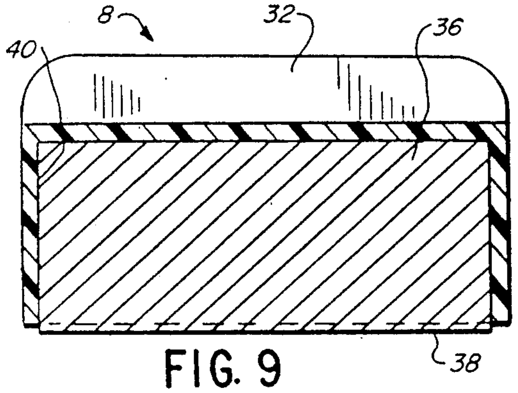
FIG. 9 is a cross sectional view of the bottom support member shown in FIG. 8

Of course, the bottom support member 8 may be fabricated similarly to the side support member 6 described above in connection with FIG. 2. A detailed cross-sectional view of the bottom support member 8 along the line 9—9 in FIG. 8 is shown in FIG. 9. The bottom support member 8 is shown with a magnetic element 36 attached to the mounting base 32 proximate its lower extremity to provide a magnetic field which passes through a bottom support surface 38 of the bottom support member 8. In FIG. 9, the magnetic element 36 is shown embedded in an internal recess 40 of the mounting base 32, and the bottom surface of the magnetic element 36 serves as the bottom support surface 38. The magnetic element 36 is easily retained in the recess 40 with an appropriate adhesive, such as described above for mounting the magnetic element 28 in the recess 30.

Alternately, the magnetic element 36 may be clamped onto, rather than fitted within, the mounting base 32 so that the design of the mounting base 32 may be simplified. This alternative arrangement is satisfactory if the attachment of the magnetic element 36 to the mounting base 32 is sufficiently secure. Another alternative arrangement for the bottom support member 8 has the magnetic element 36 fully encapsulated in the mounting base 32. This style of mounting can make the bottom support surface 38 mar free if the mounting base 32 is chosen to be a plastic material.

With still another alternative arrangement, the magnetic element may in fact be at least a region of the mounting base 32 made at least partially from some magnetizable material and then magnetized as required. For instance, the mounting base 32 may be fabricated with soft iron or a magnetizable plastic, so long as there is a magnetic field or sufficient intensity for magnetically adhering the mounting base 32 to the base fixture 4.

The magnetic element 36 may be of any material or construction suitable for securing the desired intensity of magnetic field, as described above for the magnetic element 28 in connection with FIG. 3. The mounting base 32 may be fabricated with any material or combination of materials which combine desired strength requirements with fabricability, such as the materials described above for the shoe housing 26 in connection with FIG. 3.

Figure 10:
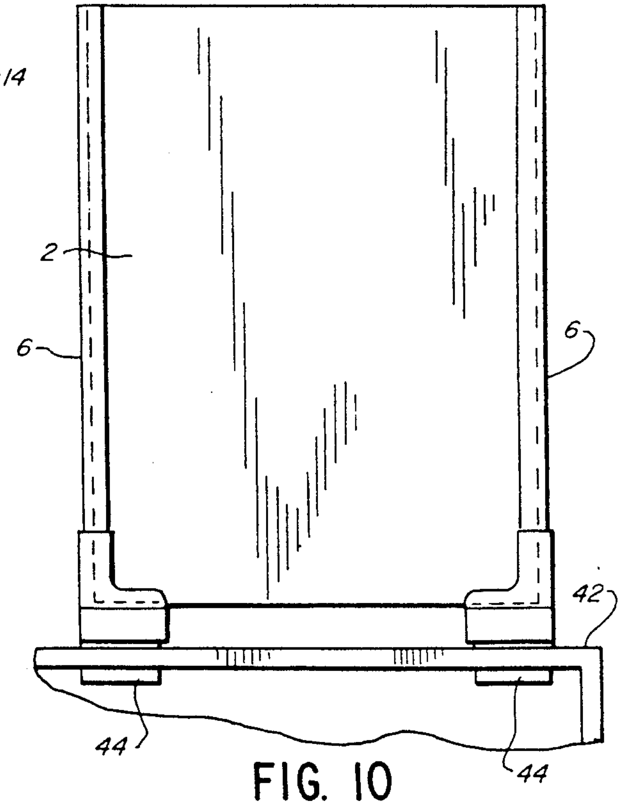
FIG. 10 is a general configuration for mounting a sign element to a non-magnetic base fixture using auxiliary magnetic elements.

FIG. 10 shows a configuration for mounting the sign element 2 with two of the side support members 6 when the sign element 2 must be fastened to a non metallic planar base fixture 42. A magnetic field conducting element 44 is placed underneath the lower surface of the planar base fixture 42 proximate each of the side support members 6 on the upper surface of the planar base fixture 42. The element 44 may be fabricated from any suitable magnetic field conducting material, such as soft iron or low carbon steel. The elements 44 provide a magnetic field path for the magnetic field in each of the side support members 6, which sets up a magnetically attractive force between the side support members 6 and the elements 44. This magnetically attractive force serves to clamp the planar base fixture 42 between each of the side support members 6 and the elements 44.

Of course, any number of the bottom support members 8 may be included when desired to provide central support for very long signs. Furthermore, the element 44 may be a single magnetic field conductive strip extending from under one of the side support members 6 to under the other one of the side support members 6, so that a single element 44 may provide the magnetic field path return for both of the side support members 6, as well as any intermediately positioned bottom support members 8. Alternately, the elements 44 may be magnetized themselves, and oriented so their fields complement and reinforce the fields of their corresponding side support elements 6 of and bottom support elements 8 for greater holding power.

Therefore, there has been herein described a universally adjustable sign mounting system with a frameless design for ease of adaptability to the mounting and support of any one of a group of signs having a wide variation in height, width, thickness and composition. The mounting system includes a magnetically attractive mounting arrangement for securing the mounting system to an associated base fixture. The magnetically attractive mounting arrangement permits rapid installation and removal of signs on a wide variety of base fixtures. It will be understood that various changes in the details, arrangements and configuration of the parts and assemblies which have been described and illustrated above in order to explain the nature of the invention may be made by those skilled in the art within the principle and scope of the present invention as expressed in the appended claims.

What is claimed is:

1. A method of securing a sign element to a base with magnetic attraction, said sign element having a left side edge, a right side edge, a bottom edge and a top edge, and utilizing a left side support member and a right side support member, each of said side support members including a support surface and an engagement surface substantially transverse to said support surface, comprising the steps of:

channeling a substantially linear side groove along a length of said engagement surface on each of said side support members, each of said side grooves including groove walls having a groove wall separation which substantially decreases with increasing groove depth;

magnetizing at least a portion of said support surface along each of said side support members;

engaging said left side edge of said sign element into said linear side groove along said engagement surface side support member;

engaging said right side edge of said sign element into said linear side groove along said engagement surface of said right side support member; and placing said support surface of each of said side support members adjacent to said base to secure said sign element to said base by magnetic attraction.

2. The method recited in claim 1, wherein said step of channeling said side groove includes channeling said side member engagement surface to arrange said channel walls with a substantially stepped interrelationship.

3. The method recited in claim 1, wherein said step of channeling said side groove includes channeling said side member engagement surface to arrange said channel walls with a substantially tapered interrelationship.

4. The method recited in claim 1, wherein said step of channeling said side groove includes channeling said side member engagement surface to arrange said channel walls with a substantially step-tapered interrelationship.

5. The method recited in claim 1, wherein said step of magnetizing said side member support surface includes the step of mounting a magnetic element within each of said side support members proximate said side member support surface.

6. The method recited in claim 5, wherein said step of mounting said side member magnetic element includes the step of orienting the magnetic field of said side member magnetic element to pass through said base.

7. The method recited in claim 6, further comprising the step of conducting said base-penetrating magnetic field of each of said side member magnetic elements.

8. The method recited in claim 1, further utilizing at least one bottom support member, each said bottom support member including a support surface and an engagement surface substantially parallel and opposite said support surface, and further comprising the steps of:

channeling a substantially linear bottom groove along the length of said engagement surface on each of said bottom support members;

magnetizing at least a portion of said support surface along each of said bottom support members;

engaging said bottom edge of said sign element into said linear bottom groove along said engagement surface of each of said bottom support members; and placing said support surface of each of said bottom support members adjacent to said base to secure said sign element to said base by magnetic attraction.

9. The method recited in claim 8, wherein said bottom grooves include groove walls having a groove wall separation which substantially decreases with increasing groove depth.

10. The method recited in claim 9, wherein said step of channeling said bottom groove includes channeling said bottom member engagement surface with a substantially stepped interrelationship.

11. The method recited in claim 9, wherein said step of channeling said bottom groove includes channeling said bottom member engagement surface to arrange said channel walls with a substantially tapered interrelationship.

12. The method recited in claim 9, wherein said step of channeling said bottom groove includes channeling said bottom member engagement surface to arrange said channel walls with a substantially step-tapered interrelationship.

13. The method recited in claim 9, wherein said step of magnetizing said bottom member support surface includes the step of mounting a magnetic element within each of said bottom support members proximate said bottom member support surface.

14. The method recited in claim 13, wherein said step of mounting said bottom member magnetic element includes the step of orienting the magnetic field of said bottom member magnetic element to pass through said base.

15. The method recited in claim 14, further comprising the step of conducting said base-penetrating field of each of said bottom member magnetic elements.

16. A method of securing a sign element to a base with magnetic attraction, said sign element having a left side edge, a right side edge, a bottom edge and a top edge, and utilizing at least one bottom support member including a support surface and an engagement surface substantially parallel to and opposite said support surface, comprising the steps of:

channeling a substantially linear bottom groove along the length of said engagement surface on each of said bottom support members, said bottom groove including groove walls having a groove wall separation which substantially decreases with increasing groove depth;

magnetizing at least a portion of said support surface along each of said bottom support members;

engaging said bottom edge of said sign element into said linear bottom groove along said engagement surface of each of said bottom support members; and placing said support surface of each of said bottom support members adjacent to said base to secure said sign element to said base by magnetic attraction.

17. The method recited in claim 16, wherein said step of channeling said bottom groove includes channeling said bottom member engagement surface to arrange said channel walls with a substantially stepped interrelationship.

18. The method recited in claim 16, wherein said step of channeling said bottom groove includes channeling said bottom member engagement surface to arrange said channel walls with a substantially tapered interrelationship.

19. The method recited in claim 16, wherein said step of channeling said bottom groove includes channeling said bottom member engagement surface to arrange said channel walls with a substantially step-tapered interrelationship.

20. The method recited in claim 16, wherein said step of magnetizing said bottom member support surface includes the step of mounting a magnetic element within each of said bottom support members proximate said bottom member support surface.

21. The method recited in claim 20, wherein said step of mounting said bottom member magnetic element includes the step of orienting the magnetic field of said bottom member magnetic element to pass through said base.

22. The method recited in claim 21, further comprising the step of conducting said base-penetrating field of each of said bottom member magnetic elements.

* * * * *